H. C. ALGER.
LIQUID METER.
APPLICATION FILED OCT. 2, 1912.

1,081,083.

Patented Dec. 9, 1913.

WITNESSES
James J. Hunt.
Irvin E. Dischinger.

INVENTOR
Harley C. Alger

UNITED STATES PATENT OFFICE.

HARLEY C. ALGER, OF CHICAGO HEIGHTS, ILLINOIS.

LIQUID-METER.

1,081,083.  Specification of Letters Patent.  Patented Dec. 9, 1913.

Application filed October 2, 1912. Serial No. 723,566.

*To all whom it may concern:*

Be it known that I, HARLEY C. ALGER, a citizen of the United States, residing at Chicago Heights, in the county of Cook and State of Illinois, have invented a new and useful Liquid-Meter, of which the following is a specification.

This invention relates to improvements in liquid measuring devices or liquid weighing machines in which a movable member having one or more measuring or weighing compartments delivers unit charges of liquid, the object being to produce a device of this character which will automatically measure or weigh the liquid passing thereto and which will measure or weigh liquid more accurately than has heretofore been possible with a device of this character.

Figure 2:
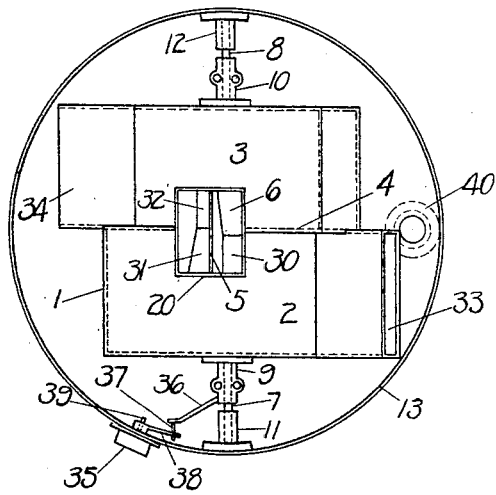
Figure 1:
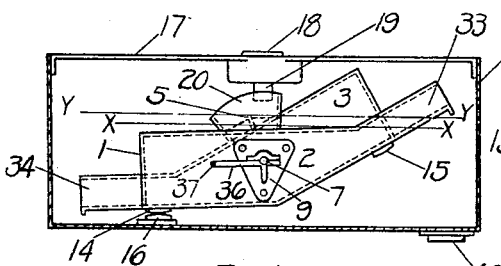
Figure 3:
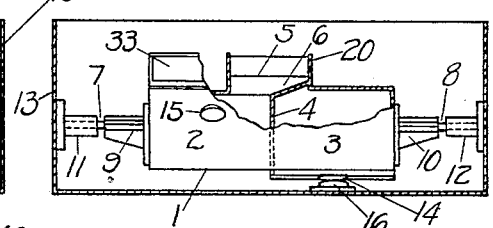

In the accompanying drawings, Figure 1 shows a vertical elevation partly in section; Fig. 2 shows a top plan view of Fig. 1 with the cross piece carrying the inlet connection removed; while Fig. 3 shows a vertical elevation partly in section at right angles to Fig. 1.

My invention consists in particular of certain novel constructions in a movable member comprising compartments for measuring or weighing liquid, which will be hereinafter described and which will be particularly pointed out in the claims.

In the accompanying drawing, 1 is a movable member divided into two measuring compartments 2 and 3 by means of a partition 4. The movable member 1 is mounted upon shafts 7 and 8 secured to brackets 9 and 10 which may be bolted or otherwise secured to the sides of the movable member 1 so that the axes of the shafts 7 and 8 are substantially coincident, the axes passing through the movable member 1 so that the measuring compartments which receive liquid to be measured are divided thereby. A part of the unit charge being on one side of the axis tends to turn the movable member 1 in one direction while a part of the unit charge being on the opposite side of the axis tends to turn the movable member 1 in the opposite direction. The center line of the axes, of the shafts 7 and 8 passing through the measuring compartments 2 and 3 is preferably below the center of gravity of the movable member 1 when either measuring compartment is filled with liquid, while the proportions of the movable member 1 may be made such that the axis is slightly below the center of gravity of the movable member when there is no liquid in either of the measuring compartments. The movable member 1 when empty will then have no point of stable equilibrium and will tilt in either direction.

The shafts 7 and 8 may be suitably journaled in bearings 11 and 12 which may be secured to the sides of a suitable inclosing case 13 or any other desired support.

Suitable bumpers 14 and 15 attached to the underside of the movable member 1 and at either side of the axis about which the movable member turns, may be arranged to strike against suitable buffers which may be secured to the bottom of the inclosing case 13, the buffer 16 being shown in Fig. 1 with the bumper 14 resting thereon holding the movable member thereon with the measuring compartment 2 in its upright position. As shown in Fig. 1 the bumper 14 with buffer 16 should be placed so that the movable member 1 will tilt slightly backward.

A cross-piece 17 suitably supported as by the sides of the inclosing case 13 may carry a suitable inlet connection 18 adapted to receive the liquid to be measured, the liquid passing through an elongated spout 19 to the measuring compartments below. A hopper 20 secured to the movable member and extending above the movable member is adapted to receive the liquid from the spout 19. The hopper 20, is separated into two parts or channels by means of a partition 5 which swings under the spout 19 as the movable member tilts. The channel shown in Figs. 1 and 2 at the right of partition 5 has a sloping bottom 6 over the part of the channel which is above compartment 3 so that liquid received from spout 19 passes through the opening 30 to compartment 2 when the movable member 1 is in the position shown with compartment 2 in its upright position. The channel shown at the left of partition 5 has a similar bottom 31 over the part of the channel which is above compartment 2 so that liquid received from spout 19 passes through the opening 32 to compartment 3 when compartment 3 is in its upright position.

The measuring compartments 2 and 3 are preferably closed on top and have noses or discharge conduits 33 and 34 extending therefrom respectively, which are open and adapted to discharge the measured water when either compartment is tipped downward to the position in which compartment 3 is shown. In Fig. 1, measuring compartment 2 is shown in its upright position and it will so remain until liquid fills the compartment and the liquid level reaches a line X—X, and any more liquid delivered to the compartment will cause the level to rise in the discharge conduit 33. The discharge conduits are made long enough so that liquid will not be discharged until the level rises beyond the line Y—Y drawn through the top edge of the partition and the proportions may be so adjusted that when the level reaches this line Y—Y or a trifle below, the liquid added in the discharge conduit 33 will be of sufficient weight to overcome any friction and cause the movable member to tilt in a clockwise direction which will discharge the liquid contained in measuring compartment 2. At the same time measuring compartment 3 will be brought to its upright position to receive liquid from spout 19 and a similar operation will be repeated. The parts may be so proportioned that, when a small stream of liquid is passing to the movable member, the movable member will tilt when the liquid level reaches the line Y—Y or slightly before. If now, liquid is being delivered at a very rapid rate under which condition liquid would tend to rise higher in the discharge conduit 33, the level will rise above the line Y—Y and a portion of the liquid will spill over the partition 5 into the opposite measuring compartment 3 which will have started to rise into its upright position and this liquid which spills over the compartment 5 will then become a part of the next unit charge to be delivered from measuring compartment 3. This arrangement will make the measuring device more accurate as the rate in the liquid supply to the movable member varies and approximately the same amount of liquid will be delivered from either measuring compartment regardless of the rate of flow.

A counter 35 which may be suitably secured to the inclosing case 13 is operated through an arm 36 extending from the bracket 9 carrying a pin 37 engaging a suitable arm 38 secured to a shaft 39 of the counter, causing the counter 35 to register the number of unit charges or the number of double unit charges which may be delivered by the movable member thus giving a complete registration of the weight or volume of liquid passing therethrough.

A suitable outlet connection 40 may be provided to conduct the measured liquid from the inclosing case 13.

It will be evident to those skilled in the art that wide variations in the proportions and arrangements of the various parts may be made within the scope of my invention. I do not therefore limit myself to the exact constructions set forth.

What I claim as my invention and desire to secure by Letters Patent is:

1. In a liquid meter, a movable member comprising two measuring compartments, a partition separating the compartments, said partition being positioned so that any excess of liquid delivered to either of the measuring compartments will spill over said partition into the other measuring compartment.

2. In a liquid meter, a member adapted to oscillate about an axis, said member comprising measuring compartments adapted to deliver liquid on opposite sides of the axis of oscillation, said measuring compartments being positioned so that any excess of liquid delivered to one measuring compartment will pass into another measuring compartment.

3. In a liquid meter, an oscillating member, means dividing the oscillating member into measuring compartments, a spout for delivering liquid to the measuring compartments and discharge conduits leading from the measuring compartments, such conduits being adapted to receive liquid from the measuring compartments and being positioned so that liquid will pass from one measuring compartment into another measuring compartment before passing out of the conduit.

4. In a liquid meter, an oscillating member comprising measuring compartments, means for supplying liquid to the compartments successively, discharge conduits leading from the compartments and means for conveying excess liquid from one compartment to the other compartment when the first compartment is filled.

5. In a liquid meter, an oscillating member comprising measuring compartments, dividing means separating the compartments and discharge conduits adapted to receive liquid from the measuring compartments to cause the oscillating member to move, such discharge conduits being positioned so that liquid will pass over the dividing means before the conduit is filled.

6. In a liquid meter, a movable member comprising two measuring compartments mounted to turn about an axis, said axis being positioned so as to pass through the measuring compartments whereby a part of the weight of the liquid is brought on either side of the axis, said compartments being separated by a partition extending in the direction of the axis, each of said measuring compartments being adapted to spill excess of liquid into the other measuring compartment.

HARLEY C. ALGER.

Witnesses:
 James J. Hunt,
 W. Lamar Williams, Jr.

Copies of this patent may be obtained for five cents each, by addressing the "Commissioner of Patents, Washington, D. C."